United States Patent

[11] 3,541,995

| [72] | Inventor | George H. Fathauer |
| | | 11 Eastmanland Place, Decatur, Illinois 62521 |
| [21] | Appl. No. | 776,537 |
| [22] | Filed | Nov. 18, 1968 |
| [45] | Patented | Nov. 24, 1970 |

[54] AUTOMATIC ANIMAL FEED CONTROL SYSTEM
16 Claims, 3 Drawing Figs.

[52] U.S. Cl. .................................................. 119/51,
340/152, 340/258; 343/225; 119/56
[51] Int. Cl. ....................................................... A01k 05/02
[50] Field of Search ............................................. 119/51 to
56, 51.11; 343/225; 340/171, 196, 152, 258

[56] References Cited
UNITED STATES PATENTS

| 2,774,060 | 12/1956 | Thompson ..................... | 340/258 |
| 3,180,321 | 4/1965 | Aldinger ....................... | 119/51 |
| 3,260,034 | 7/1966 | Major ............................ | 119/106 |
| 3,465,724 | 9/1969 | Broadbent .................... | 119/51 |

*Primary Examiner*—Aldrich F. Medbery
*Attorney*—Pendleton, Neuman, Williams & Anderson ABSTRACT: A system is disclosed which is capable of the automatic control of any process or operation in response to the propinquity, duration of dwell time and frequency of the presence of a self-contained movable transponder in the field of an interrogator. One described embodiment controls the operation of an animal feedbox used to feed a plurality of animals such that the feeding rate of any individual animal may be regulated. The apparatus comprises an interrogator which transmits a radio frequency signal to a transponder attached to the animal. Each transponder measures the dwell time of the animal at the feed station and discharges feed at the station in accordance with a predetermined program. When the correct feed discharge and consequent consumption is reached, the response of the transponder to the radio frequency signal is altered in a way detectable at the interrogator and the discharge is terminated. Only when another eligible animal enters the field will additional feed be discharged at that station.

Patented Nov. 24, 1970

3,541,995

INVENTOR
GEORGE H. FATHAUER
BY Pendleton, Neuman
Seibold & Williams
ATTY'S

AUTOMATIC ANIMAL FEED CONTROL SYSTEM

This invention relates to a control system for automatic control of processes and operations. More particularly, the invention relates to the provision of a control apparatus for an automatic animal feedbox such that any number of animals may eat at the same feed station yet each will receive an individually controlled amount of feed programed to its nutritional requirements in a given time period. While the control apparatus of this invention has many applications and even the feed control embodiment is useful with a number of different kinds of animals, it finds particular use with milk producing cows. It will, therefore, be discussed with relation to cow feeding programs in the ensuing disclosure.

In the development of modern farming techniques, much activity has been devoted to milk production. It has been found and is now well known that the milk output of any cow may be varied by altering such factors as the environment in which she lives, the amount of sleep she gets, and the kind and amount of food she eats. Through understanding and controlling such factors, her milk output may be optimized when measured by such standards as volume of milk production or percent of cream content. However, the optimizing level for each factor varies among different cows and, moreover, as to any individual cow varies according to where she is in her lactic cycle.

Of the factors mentioned above, one of the easiest to analyze and understand is the rate at which each cow is fed, i.e., the size of the food ration she gets during a fixed time period. It is desired, however, that a method for feeding be devised which eliminates the necessity of a human attendant having to identify the cow, determine her feed requirements, and measure her food rations. Not only is it expensive to have an attendant to do this, but a cow may not eat her entire ration at any particular time. She may either tire of eating and wander away or be butted away from the feedbox by another cow. The traditional method of feed control has been to calculate the average requirements of the herd and then assume that each cow will get her share. This does not prove to be true.

One method of enhanced control which has been proposed to solve this problem is to feed the cows in their stalls during their semidaily milking periods. There is usually already an attendant at the milking stalls to identify the cow and start the milking machines; in addition he must check a chart to find the cow's feed requirements and start an auger or similar automatic feed mechanism which dispenses the proper amount of feed at the given station. This technique has the disadvantage that it usually takes significantly longer for a cow to eat her half day's feed ration than to be milked. Thus, the milking equipment in the stall would be out of use for the time it took the cow to finish her feed after she had been milked.

Another proposed method is to have separate feeding stalls which the cows enter after they have been milked, for any particular installation the ratio of the number of feeding stalls to milking stalls being approximately the same as the average ratio of milking time to feeding time. After each individual cow is finished being milked, she would be taken from a milking stall, put in a feeding stall, and either manually or automatically given the proper amount of feed. This method has a number of disadvantages. It still requires a human attendant to identify which cow is in which stall and to make sure each cow receives the proper amount of food. A cow would not get her proper ration if she tired of eating and wandered away. Finally, with a small herd, the feeding stalls are used inefficiently since they can only be used twice a day, after the milking periods.

Accordingly, it is an object of this invention to provide an automatic control system which is capable of controlling a process or operation by sensing the position of a transponder by field effect phenomenon. It is another object to provide a means for automatically dispensing controlled amounts of feed to one or more animals such as cows at periodic intervals over an extended time.

More particularly, it is an object of this invention to provide a system for the control of an automatic feedbox whereby feed will be dispensed to one or more cows at individually controlled rates at random feed stations.

Further, it is an object to provide an automatic system which does not require the presence of a human attendant or a means by which individual cows can be visually recognized.

It is an object of the invention to provide an apparatus in which the only data storage means is carried in a mobile self-powered transponder.

It is a further object of this invention to provide a feedbox control system which will permit a cow to eat her ration in increments at spaced intervals rather than at one time. It is another object of this invention that if more than two feed stations so equipped are available to any one cow eating from a plurality of boxes, it will not affect the amount of feed she receives.

An additional object is to provide a control apparatus which will be relatively secure and not set the feedbox into operation at undesired times in response to spurious commands.

Finally, it is an object of this invention to provide such a system which uses few parts and is not prohibitively costly.

Further objects and advantages of this invention will appear from the subsequent drawings, description, and claims.

In carrying out this invention in one form a control system having an interrogator and a transponder is provided. More specifically, the interrogator regulates the operation of an automatic feedbox which, when actuated, dispenses feed at specific stations. The interrogator includes a radio frequency oscillator, the output of which is applied to a tuned loop inductor in the vicinity of the associated feed station. The cow carries the transponder which contains a parallel L-C circuit resonant at the frequency of the oscillator. When the cow approaches the feedbox, the resonant circuit is excited, its output is rectified, and the resultant DC power drives the entire transponder which includes a constant current source and a multivibrator. The output of the multivibrator is used to switch a capacitor in and out of the parallel resonant circuit thus causing the resonant frequency of the circuit to vary at the frequency of the multivibrator.

At the interrogator the change in resonant frequency is reflected as a change in the phase of the voltage across the loop inductor. A phase comparator detects that phase change by comparing the loop voltage with the oscillator output. The presence or absence of a phase change at the multivibrator frequency is then used to operate a set of relay contacts which regulates the functioning of the auger or other automatic feed mechanism at the particular station.

While the feeding mechanism is operating, the constant current source of the transponder charges a capacitor at a constant rate. When a predetermined voltage appears across the capacitor indicating the cow has been at the feedbox for a certain period of time and received her proper ration, the multivibrator is disabled and the phase change of the transponder loop voltage required to actuate the system no longer occurs, terminating feedbox operation at that station. There is additionally a high resistance discharge path for the capacitor so that while the cow is away from any feed station, the capacitor voltage will fall by an amount related to the length of the period since she was last fed and, thus, to the amount of food she should receive if fed at any given time.

For a more complete understanding of the invention, reference will now be made to the drawings, wherein.

Figure 1:
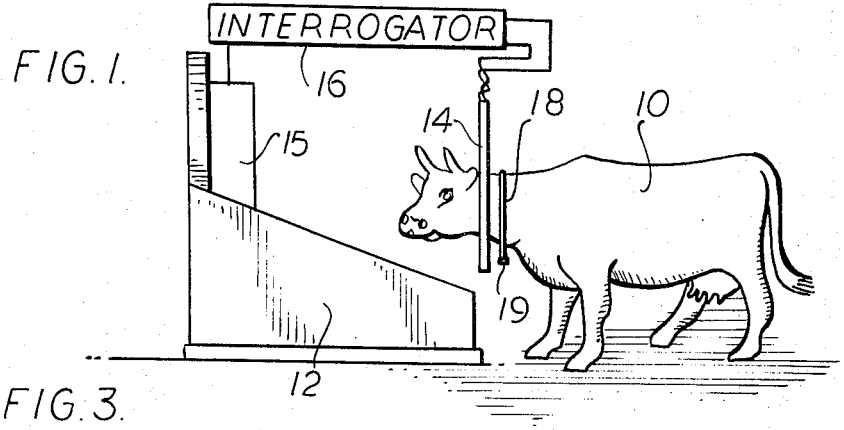
FIG. 1 is a pictorial view showing a part of a preferred embodiment of the present invention as it might be used for an automatic cow feeder.
Figure 2:
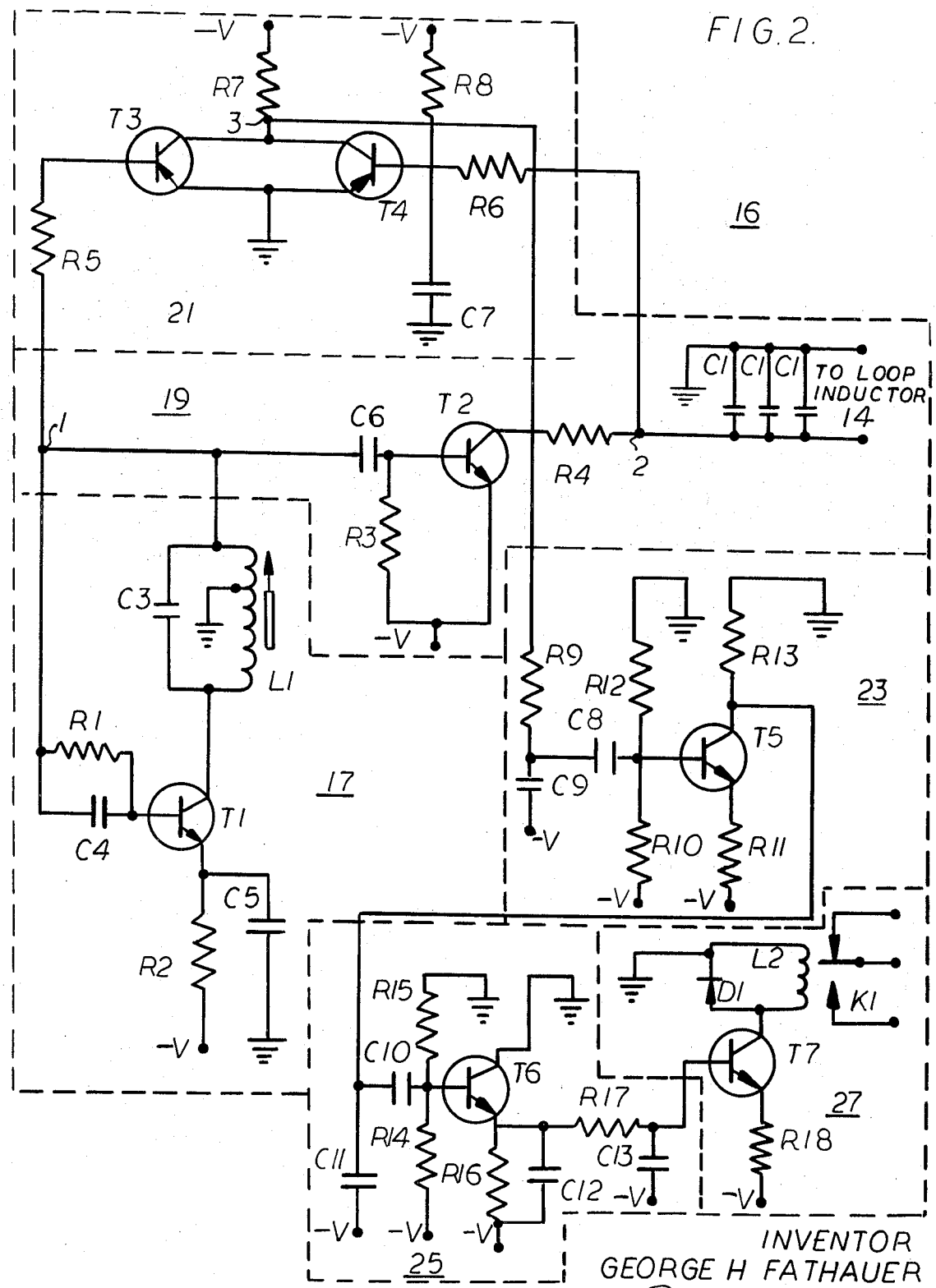
FIG. 2 is a schematic drawing of the interrogator of the embodiment of FIG. 1.

Referring now to the drawings, and more particularly to FIG. 1, there is shown a cow 10 standing in front of feedbox 12. The cow has her neck through loop inductor 14 at a specific feed station which is connected to an interrogator 16, the essential schematic drawing of which is shown in FIG. 2. The interrogator 16 actuates a feeder system 15 which may be an auger or similar device adapted to discharge feed only at the particular station which has been properly signaled. The cow has placed around her neck a metal band 18 to which is attached a transponder 19, the essential schematic drawing of which is shown in FIG. 3.

Feedbox 12 usually comprises a plurality of stalls or stations with each station having a separate feeding device such as an auger as is well known in the art. The feeding device contains or is attached to a feed storage bin. When the feed system 15 is activated, feed is dispensed at a predetermined rate and made available for the cow to eat. Ideally, that rate should be approximately the same as the cow's rate of intake, normally about 1 pound per minute. The feed system 15 is electrically connected to and its operation controlled by relay contacts in interrogator 16.

The interrogator 16 comprises a radio frequency oscillator 17 connected to tuned loop 14 through an RF amplifier 19, a phase comparator 21 for comparing the phase of the oscillator with that of the voltage across loop 14, an amplifier 23 to amplify the output of the phase comparator 21, a detector 25 detect the presence of the required output from the phase comparator 21, and an output amplifier 27 which controls relay contacts K1 and, thus, the operation of feedbox 12. The various stages are connected together as indicated in FIG. 2.

Figure 3:
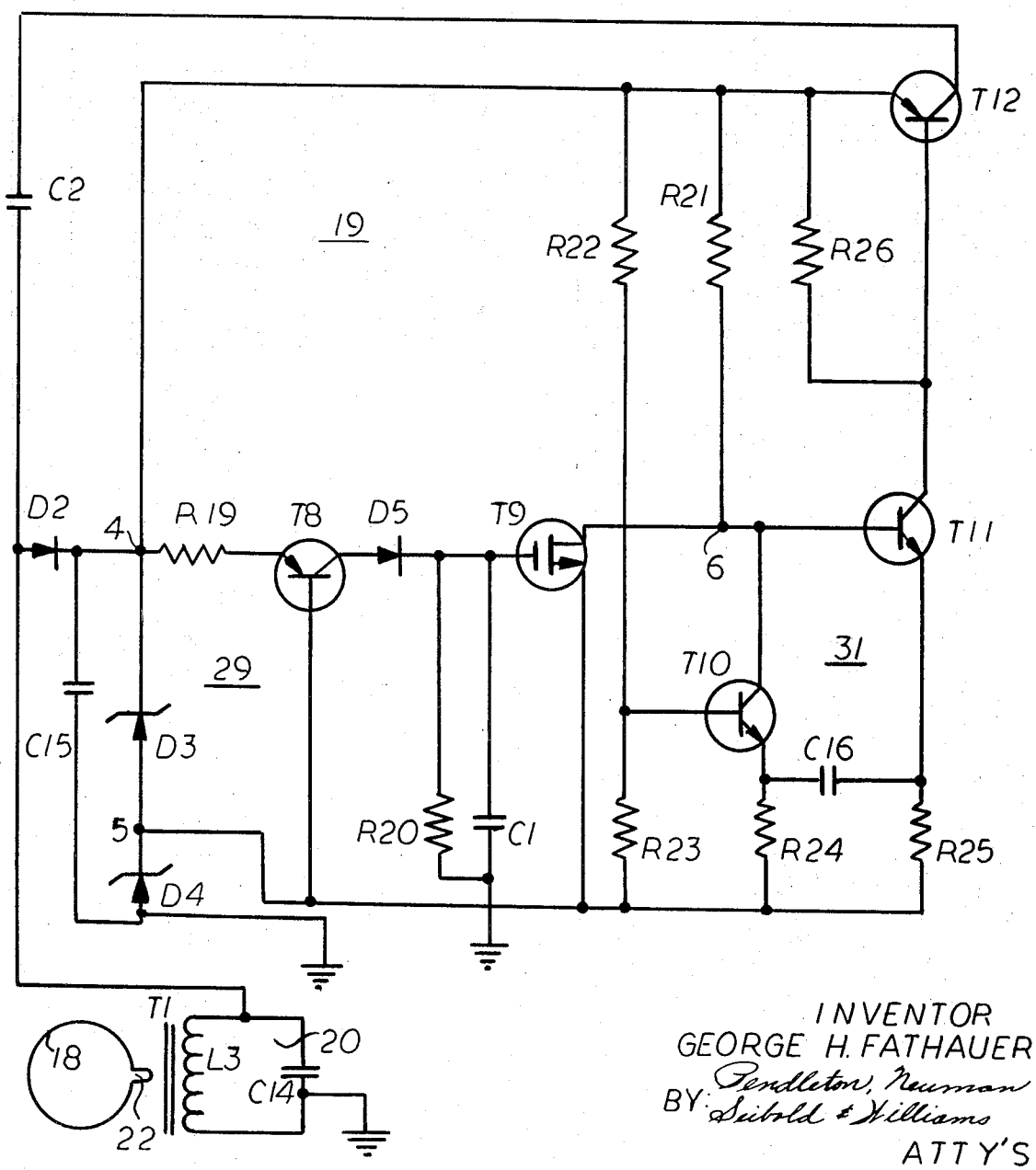
FIG. 3 is a schematic drawing of the transponder of the embodiment of FIG. 1.

As shown in FIG. 3, the transponder 19 comprises a tuned circuit 20 resonant at the frequency of the oscillator 17 in the interrogator, a constant current source 29 and a multivibrator 31 which are both driven by the rectified output of the tuned circuit 20, a storage capacitor C1 and a resistive discharge path R20, a control switch T9 for disabling the multivibrator 31 when the voltage on the storage capacitor C1 reaches a fixed level, and an output switch T12 controlled by the multivibrator 31 which determines whether a capacitor is in or out of the tuned circuit.

Referring now to FIG. 2, the radio frequency oscillator 17 comprises NPN transistor T1 connected in the normal fashion as a Hartley, tuned collector, oscillator. The parallel combination of capacitor C3 and slug tuned coil L1, L1 having a grounded tap, are connected between the collector of T1 and circuit point 1. The values for capacitor C3 and coil L1 determine the frequency of the oscillator which, in one particular application of this invention, was 100-Hz. Resistor R1 and capacitor C4 are similarly connected in between the base of transistor T1 and circuit point 1. Additionally, the emitter of transistor T1 is connected through resistor R2 to a source of negative voltage for proper biasing of T1 and through capacitor C5 to ground.

The output of the oscillator is taken from circuit point 1 and applied through DC blocking capacitor C6 to the base of NPN transistor T2 in the RF amplifier 19. A source of negative voltage is applied directly to the emitter of T2 in the common emitter configuration and through biasing resistor R3 to the base of T2. Load resistor R4 is connected between circuit point 2 and the collector of T2 and the output of the amplifier 23 at point 2 is thus 180° out of phase with the input. The amplifier 23 has three purposes, to invert the output of the oscillator 17, to isolate the loop 14 from the oscillator 17, and to provide sufficient power to the loop.

Connected to circuit point 2 is the parallel combination of tuning capacitors C1 and loop 14. The loop is shown pictorially in FIG. 1. It is positioned in front of the feed station so that the cow must insert her head through it in order to eat. In one particular application, a loop of three turns of wire in a rectangular shape measuring approximately 1½ by 3 feet has proven practical. The values of tuning capacitor C1 are selected to tune the loop to the frequency of the oscillator 17. The use of a plurality of capacitors to tune the loop is shown as it has been found impractical to use a variable capacitor because of the size of the capacitance required.

The phase comparator 21 comprises in part PNP transistors T3 and T4. The output of the oscillator at circuit point 1 is connected through resistor R5 to the base of T3. The base of T4 is connected through resistor R6 to circuit point 2. The emitters of both transistors T3 and T4 are connected to the common ground. The collectors of T3 and T4 are both connected to circuit point 3 and through resistor R7 to a source of negative voltage. The base of transistor T4 is additionally connected to ground through capacitor C7 and to a source of negative voltage through resistor R8.

Transistor T3 and T4 are arranged so that if the emitter-collector output circuit of either or both is conducting, the phase comparator output at circuit point 3 will be near ground level; when neither is conducting the output will be approximately the value of the negative voltage supply. Thus, the phase comparator will have a pulsed output at the oscillator frequency, the pulse duration indicating the phase relationship of the voltages at circuit points 1 and 2. It is advantageous to adjust the values of R6 and C7 so that the signal on the base of transistor T4 will lag that at circuit point 2 by approximately 60° and the comparator output will be at ground for approximately 300° when loop indicator 14 is tuned to the frequency of oscillator 19. The resulting output is more stable and easier to use than what would result is the signals on T3 and T4 were 180° out of phase in the tuned state of the loop inductor. When the loop is slightly detuned, as by a change in its inductance, the phase of the signal on the base of T4 will be changed and the pulses of the comparator output will have a different duration. As will be described subsequently, the transponder 19 is such that it effectively varies the inductance of loop 14 at the frequency of its multivibrator 31, approximately 400-Hz, when the feed system 15 is to be activated. Thus, when a multivibrator 31 in the field of loop 14 is operating, the output of the phase comparator 21 will be a series of 100-Hz pulses with their duration modulated by a 400-Hz rectangular wave.

The output of the phase comparator 21 is taken from circuit point 3 and applied through resistor R9 and DC blocking capacitor C8 to the base of NPN transistor T5 of the amplifier 23. Capacitor C9 is connected between the common connection of R9 and C8 and the negative supply source. The size of capacitor C9 is relatively small so that only the 100-Hz component of the signal at circuit point 3 will be filtered out. The size of capacitor C8 is relatively large so that the 400-Hz component of that same signal is coupled to transistor T5 while blocking any DC component. Such DC levels arise from the lag of the signal on the base of transistor T4 from that at circuit point 2 and slow changes in the inductance of the loop 14 as may occur if an object in its vicinity is moved or moisture conditions change. The base and emitter of transistor T5 are connected to a negative voltage source through resistors R10 and R11, respectively, while the base and collector are connected through resistor R12 and R13, respectively, to ground.

The base of detector transistor T6 is connected through DC blocking capacitor C10 to the collector of transistor T5. That collector is also connected to filter capacitor C11 and, thus, to the negative supply to further remove any 100-Hz signal that may still be present. The base of transistor T6 is connected through biasing resistors R14 and R15 to the negative supply source and ground, respectively. The collector of transistor T6 is connected to common ground, while the emitter is connected through the series combinations of resistor R17 and capacitor C13 in parallel with resistor R16 and capacitor C12 to the negative supply source. The output of transistor T6 is thus applied to a resistive-capacitive filter composed of C12, R17, and C13. The filter smooths out the 400-Hz rectangular wave output of transistor T6 and gives an output related to the average level of that rectangular wave. That output is applied directly to the base of NPN transistor T7 in the output amplifier 27.

The emitter of transistor T7 is connected to the source of negative potential through resistor R18. The collector of T7 is connected to ground through the parallel combination of relay coil L2 and diode D1, D1 being arranged as a buffer. Thus, when a sufficient DC level is present on the base of transistor T7, the emitter-collector circuit will become highly conductive and current will flow through coil L2 and actuate relay contacts K1, which in turn actuates the feeder 15.

Turning to FIG. 3, the metal band 18 is placed around the cow's neck. The transponder 19 is physically attached to the band 18. Loop 22 on band 18 forms the primary winding of transformer T1 and coil L3 forms the secondary. The tuned circuit of coil L3, in parallel with capacitor C14, is tuned to be resonant at the frequency of the oscillator in the interrogator. One side of the tuned circuit is connected to a common ground and the other side is connected to the anode terminal of diode D2. The cathode of D2 is attached to circuit point 4 which is in turn connected through the parallel combination of capacitor C15 with zener diodes D3 and D4 in series to ground. Diodes D3 and D4 are placed in the circuit so that their direction of avalanche conductivity is positive with respect to ground. Capacitor C15 is charged by current from the tuned circuit through diode D2 to a voltage determined by the sum of the inverse avalanche voltages of D3 and D4; it is relatively large and is used to supply power to the constant current source and the multivibrator.

The emitter of PNP transistor T8 is connected through resistor R19 to circuit point 4, the base being connected to the common connection of zener diodes D3 and D4 at circuit point 5. When the tuned circuit is sufficiently excited, the voltage across diode D3, and, thus, the voltage on the emitter base junction of T8, will be relatively constant. The current flow through the collector-base junction of T8 will, then, also be relatively constant. Transistor T8 is, thus, biased as a constant current source with resistor R19 determining the output.

The collector of transistor T8 is connected to the anode of diode D5 whose cathode is connected through the parallel combination of resistor R20 and storage capacitor C1 to ground. Resistor R20 is of a relatively high value so that when current flows from T8 through D5 most of it is stored in capacitor C1. Diode D5 prevents capacitor C1 from discharging through the collector circuit of T8. Diode D5 should be of relatively high quality with low reverse leakage current.

The values of R19, R20, and C1 are critical. Resistor R19 determines the rate at which capacitor C1 will charge and the RC time constant of R20 and C1 the rate at which it will discharge; they, thus, determine the rate at which the individual cow carrying the transponder will be fed. When transistor T8 supplies charging current to C1, the voltage on C1 will build up at a rate determined by R19 to a fixed level, the multivibrator will operate, and the interrogator will actuate the feed system so that feed is dispensed to the cow. When the voltage on C1 reaches the fixed level and is fully charged, the feed system is stopped and the cow will finish any remaining feed and leave.

Capacitor C1 will then discharge through resistor R20 at a very slow rate and the voltage across C1 will decay with time in the normal manner. The difference between the voltage on the capacitor at any time then, and its fully charged level is an indication of how long it has been since the cow was last fed and, thus, how much feed she should get if she were to approach the feedbox at that time. When she does go to the feedbox again, feed will be dispensed until C1 is again fully charged. Alternatively, if at any time the cow leaves before C1 is fully charged, the voltage on the capacitor C1 will decay only from the value it had obtained when she left. Thus, she will not miss any of her ration merely because she did not eat it all at one time.

Continuing with the circuit description, the cathode of diode D5 is connected to the gate element of metal of silicon, field effect transistor T9. The drain element of T9 is connected to circuit point 6 and through load resistor R21 to circuit point 4 and the source element is connected to circuit point 5. The field effect transistor T9 has a practically infinite input impedance and will, therefore, have a negligible effect on the operation of C1.

NPN transistors T10 and T11 are connected together as an emitter coupled multivibrator 31. The base of transistor T10 is connected to circuit points 4 and 5 through biasing resistors R22 and R23, respectively. The emitter of T10 is connected through resistor R24 to circuit point 5 and through capacitor C16 to the emitter of T11 which is also connected to circuit point 5 but through resistor R25. The collector of T10 and base of T11 are coupled together at circuit point 6. Resistor R26 connects circuit point 4 to the collector of transistor T11. The multivibrator circuit is such that transistors T10 and T11 will be in alternate conductive and nonconductive states. The frequency will depend primarily on the values of capacitor C16 and resistors R24 and R25. As stated above, one convenient value for that frequency is approximately 400-Hz.

The output of field effect transistor T9 controls the operation of the multivibrator 31. When C1 is fully charged, T9 conducts, the base of T11 is held at the potential of its emitter, and the collector of T10 is held at the potential of its emitter, thus deactivating the multivibrator. When, however, C1 is partially discharged, T9 is cutoff and the multivibrator may operate freely provided there is a potential at point 4.

The output of the multivibrator 31 is taken from the collector of transistor T11 and applied directly to the base of output switching PNP transistor T12. The emitter of T12 is connected to circuit point 4 and the collector to the anode of diode D2 through capacitor C2. Since circuit point 4 is at an effective AC ground due to the relatively large size of capacitor C15, when the multivibrator is activated, capacitor C2 is switched in and out of parallel with capacitor C14 by transistor T12, thus varying the resonant frequency of the tuned circuit 20 including L3 and C14 at the frequency of the multivibrator.

By changing the resonant frequency of the tuned circuit, the amount of RF energy at the frequency of the oscillator that will be absorbed by metal band 18 is varied. As is well known, this varies the reflected impedance of loop 14 connected to the interrogator 16 and, therefore, the phase of the voltage across the parallel combination of loop 14 and tuning capacitors C1. This phase variation is detected and used to operate the automatic feed system 15 as discussed above.

In one particular use of this invention, it has been found to be desirable to construct the transponder units and encapsulate them in molded plastic material. It has not, however, been found to be practicable to construct the units with a variable element substituted for capacitor C1 or resistors R19 or R20 as the animals are likely to upset any adjustments that might be made. It has been found advantageous to construct about 10 different varieties of transponders, each having different values for components C1 and R19. The different transponders may then conveniently be painted different colors so that the feeding rate which any individual transponder is designed to produce may easily be identified. The herdsman may then be given a chart identifying the various cows and the rates at which they are to be fed at any particular time and he then merely places the proper colored transponder on each cow. The entire transponder 19 can be molded within a cylinder which is about 2 inches in diameter and 1 inch thick. This may be molded directly on the loop 18 which is preferably a stainless steel strap having a quick disconnect device for easy application to, and removal from the animal.

It will be obvious that certain modifications of the specific embodiment shown may be made without departing from the spirit and scope of this invention. For example, the control system could be used to control the feeding rates of animals other than cows and for other control purposes. The relative positioning of the loop and metal band could be altered. Details of the circuitry could be varied in numerous different ways.

It will thus be seen that a control system has been provided which gives a simple method of individually controlling the rates at which a plurality of phenomenon such as animal feeding occur. The apparatus avoids the necessity of identifying individual animals or units as they approach the field. The control apparatus is also secure in that it will actuate the feedbox only when the phase of the transmitted signal is varied relatively rapidly and can be frequency selective if desired by substituting a band pass filter in the output amplifier 23.

While a particular embodiment of this invention is shown above, it will be understood, of course, that the invention is not to be limited thereto, since many modifications may be made, and it is contemplated, therefore, by the appended claims to cover any such modifications as fall within the true spirit and scope of this invention.

I claim:

1. A system for controlling the operation of an electrical means regulating the availability of feed to an animal comprising:
   An interrogator operatively connected to said electrical means and having a radio frequency oscillator generating a signal and an inductor loop tuned to respond to the frequency of that oscillator and coupled to it;
   A transponder carried by said animal and having tuned circuit means with a resonant frequency directly related to the frequency of said radio frequency oscillator and coupled by field effect means to said interrogator, energy storage means, and coupling means for connecting said tuned circuit to said storage means; and
   Control means responsive to the level of energy in aid energy storage means to change the resonant frequency of said tuned circuit said interrogator sensing said change and operating said electrical means in response thereto to regulate the availability of feed to the animal.

2. The system of claim 1 wherein said coupling means includes an active electronic component biased as a constant current source.

3. The system of claim 1 wherein said control means comprises an oscillator and a capacitor, the capacitor being coupled to said oscillator and said tuned circuit so that said capacitor is alternately included within and excluded from said tuned circuit whenever said storage device is in a predetermined condition.

4. The system of claim 1 wherein said interrogator includes phase comparing means having an output for comparing the phase of the signal generated by said radio frequency oscillator and the phase of the voltage across said loop, the output of said phase comparing means being used to control the operation of said electrical means.

5. The system of claim 4 wherein said control means comprises an oscillator and a capacitor, the capacitor being coupled to said oscillator and said tuned circuit so that said capacitor is alternately included within and excluded from said tuned circuit whenever said electrical means is to be operated.

6. The system of claim 5 wherein said interrogator includes detector means responsive to the output of said phase comparing means for detecting whether the phase of said voltage across said loop varies with respect to said phase of the signal generated by said radio frequency oscillator at approximately the frequency of the oscillator of said control means.

7. The system of claim 6 wherein said energy storage means is coupled to said oscillator to control the operation of said oscillator, said energy storage means having a charging circuit energized whenever said animal is in the field of said loop and a charging rate directly related to the feed consumption rate of the animal, said storage means having a discharging circuit with a substantially longer time constant than said charging circuit and directly related to the feed utilization rate of the animal.

8. A system for controlling the feeding program of animals comprising:
   An animal feed station;
   Means to discharge feed at said station;
   Control means for actuating the discharge means;
   Sensing means generating a field effect in association with said station; and
   A transponder secured to said animal receiving and storing information from said field effect concerning the time period and frequency when said animal is at said feed station and reflecting said information into said sensing means, said sensing means evaluating said information and operating said control means in response thereto.

9. The system of claim 8 wherein said sensing means includes a tuned circuit and said transponder includes means to detune said tuned circuit to indicate the position of said animal.

10. The system of claim 9 wherein said transponder includes means to detune said tuned circuit in a predetermined periodic pattern to prevent spurious operation from other sources.

11. The system of claim 10 wherein means are provided to change the periodic pattern of said transponder when said animal has been at said feed station a predetermined total time within a prescribed period whereby operation of discharge means is temporarily terminated.

12. The system of claim 11 including a plurality of animals, each having a transponder attached thereto.

13. The system of claim 12 including a plurality of feed stations. 1

14. A system for individually controlling the rates of feed consumption of a plurality of animals comprising:
   feed dispensing means for making feed available to an animal in the vicinity thereof;
   field generating means for generating a field effect in the vicinity of said feed dispensing means;
   transponding means associated with each of said animals having means responsive to said field effect indicating the time period and frequency that said animal is in the vicinity of said feed dispensing means and means responsive to said indicating means for altering said field effect; and
   sensing means for detecting said alterations in said field effect and operating said feed dispensing apparatus in response thereto.

15. The system of claim 14 wherein said transponding means further includes a tuned circuit responsive to said field effect, energy storage means operatively connected to said tuned circuit for storing energy levels related to the time period and frequency that said animal is in the vicinity of said feed dispensing means, and means responsive to the level of energy stored in said energy storage means for altering the resonant frequency of said tuned circuit.

16. The system of claim 15 wherein said tuned circuit resonant frequency altering means includes means for periodically varying said resonant frequency when said energy storage level is within a predetermined range to prevent spurious operation of said feed dispensing means.

UNITED STATES PATENT OFFICE
CERTIFICATE OF CORRECTION

Patent No. 3,541,995          Dated November 24, 1970

Inventor(s) George H. Fathauer

It is certified that error appears in the above-identified patent and that said Letters Patent are hereby corrected as shown below:

Column 1, line 7  -  "programed" should be -- programmed --

Column 3, line 24 -  Insert -- to -- after "25"

Column 3, line 47 -  "100-Hz" should be -- 100-KHz --

Column 3, line 48 -  After "in" insert -- parallel --

Column 4, line 25 -  "is" should be -- if --

Column 4, line 36 -  "100-Hz" should be -- 100-KHz --

Column 4, line 43 -  "100-Hz" should be -- 100-KHz --

Column 4, line 59 -  "100-Hz" should be -- 100-KHz --

Column 5, line 69 -  "of" (second occurrence) should be -- on

Column 7, line 25 -  "aid" should be -- said --

Column 7, line 27 -  After "circuit" insert -- , --

Column 8, line 34 -  Delete "1" after "."

Signed and sealed this 30th day of March 1971.

(SEAL)
Attest:

EDWARD M. FLETCHER, JR.　　　　　　　WILLIAM E. SCHUYLER, J
Attesting Officer　　　　　　　　　　Commissioner of Patent